United States Patent [19]
Takahashi et al.

[11] Patent Number: 5,969,761
[45] Date of Patent: Oct. 19, 1999

[54] IMAGE SENSING DEVICE

[75] Inventors: Koji Takahashi; Teruo Hieda; Chikara Satoh; Toshiyuki Masui, all of Kanagawa-ken; Takashi Kobayashi, Tokyo; Katsuji Yoshimura, Kanagawa-ken, all of Japan

[73] Assignee: Canon Kabushiki Kaisha, Tokyo, Japan

[21] Appl. No.: 08/802,279

[22] Filed: Feb. 19, 1997

Related U.S. Application Data

[63] Continuation of application No. 08/386,119, Feb. 9, 1995, Pat. No. 5,638,118, which is a continuation of application No. 08/260,038, Jun. 15, 1994, abandoned, which is a continuation of application No. 08/219,747, Mar. 29, 1994, abandoned, which is a continuation of application No. 07/935,046, Aug. 25, 1992, abandoned, which is a division of application No. 07/601,014, Oct. 19, 1990, Pat. No. 5,162,914, which is a continuation of application No. 07/202,115, Jun. 3, 1988, abandoned.

[30] Foreign Application Priority Data

| Jun. 9, 1987 | [JP] | Japan | 62-143884 |
| Jun. 9, 1987 | [JP] | Japan | 62-143885 |
| Jun. 9, 1987 | [JP] | Japan | 62-143886 |
| Jun. 9, 1987 | [JP] | Japan | 62-143887 |
| Aug. 31, 1987 | [JP] | Japan | 62-217376 |
| Oct. 6, 1987 | [JP] | Japan | 62-251903 |
| Oct. 6, 1987 | [JP] | Japan | 62-251904 |

[51] Int. Cl.$^6$ ........................................... H04N 7/00
[52] U.S. Cl. ..................... 348/362; 348/361; 348/297; 348/298; 348/229; 348/230
[58] Field of Search ........................ 349/201, 362, 349/364, 297, 298, 229, 238; 366/222

[56] References Cited

U.S. PATENT DOCUMENTS

| 4,613,906 | 9/1986 | Tanaka et al. | 348/239 |
| 5,309,243 | 5/1994 | Tsia | 348/229 |

*Primary Examiner*—Nathan Flynn
*Attorney, Agent, or Firm*—Robin, Blecker & Daley

[57] ABSTRACT

The image sensing device adapted to compose an appropriate single picture from a plurality of pictures of different exposures obtained from the same subject, wherein the camera operation is controlled using as a reference the signal of one of said plurality of pictures of different exposures.

7 Claims, 15 Drawing Sheets

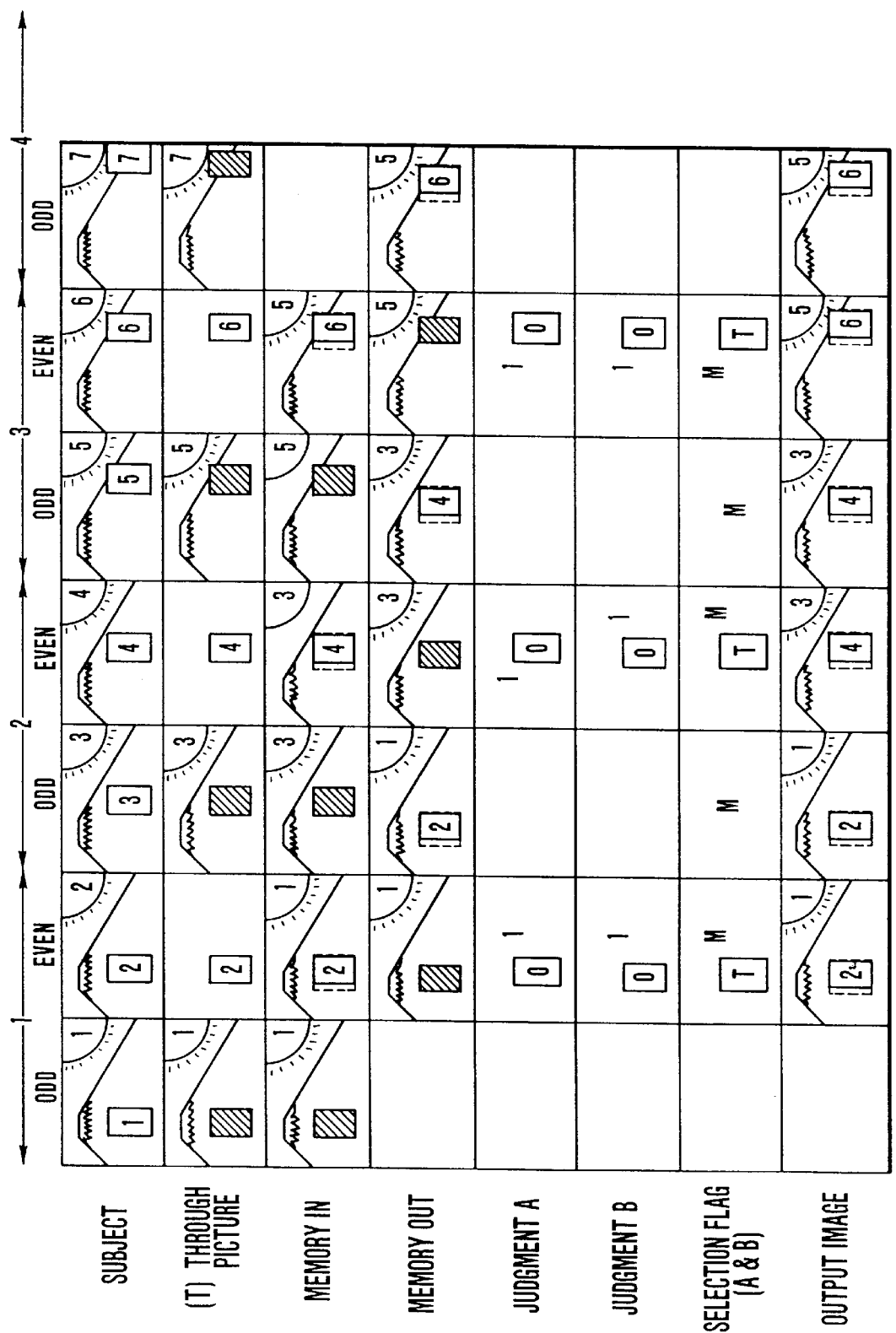

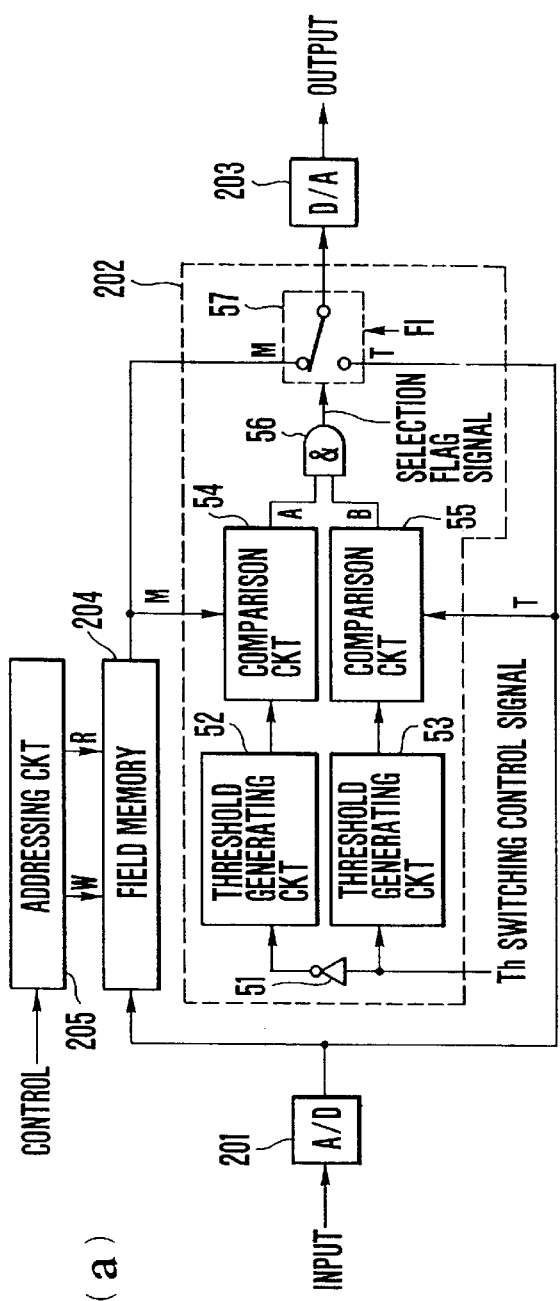
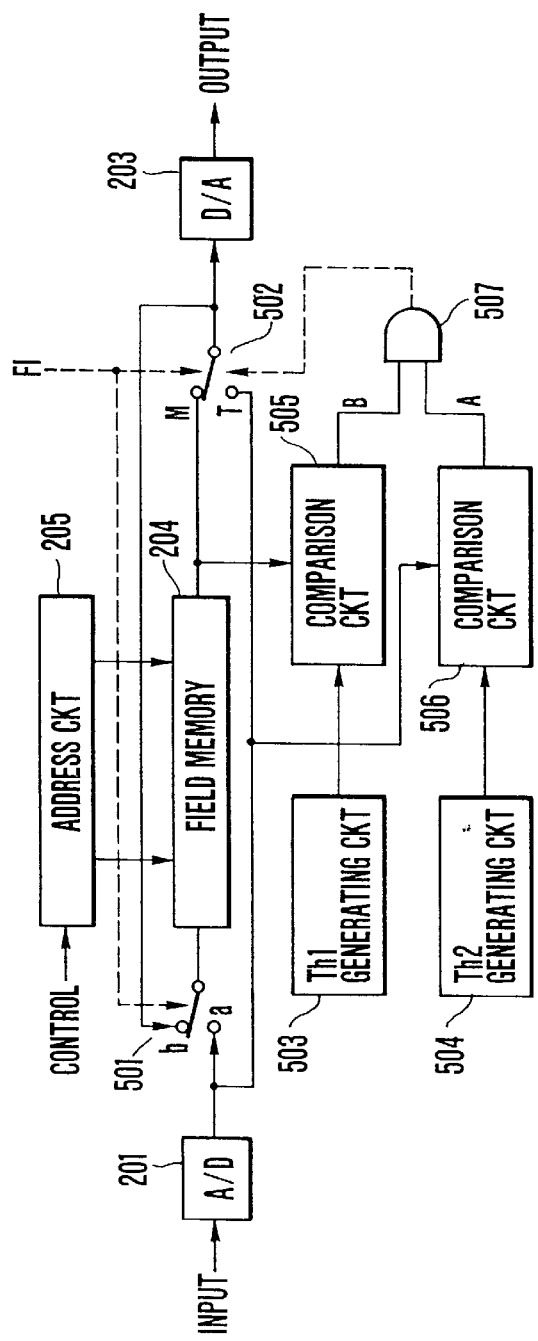
FIG.5(a)
FIG.5(b)

FIG.6(a)
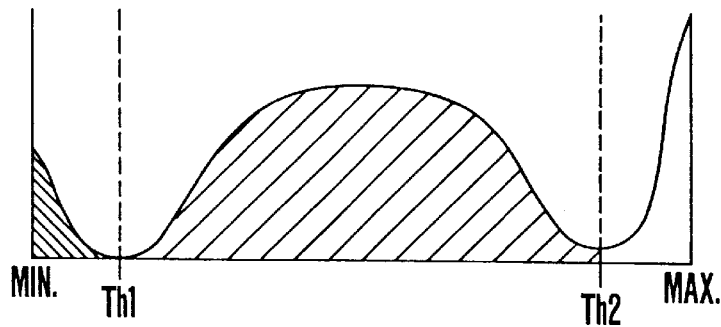
FIG.6(b)
| FIELD | T (THROUGH) | M (MEMORY) |
|---|---|---|
| ODD | Th1 | Th2 |
| EVEN | Th2 | Th1 |
FIG.6(c)
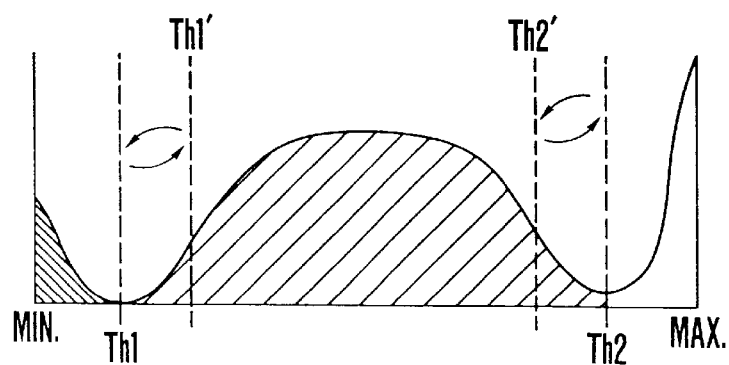

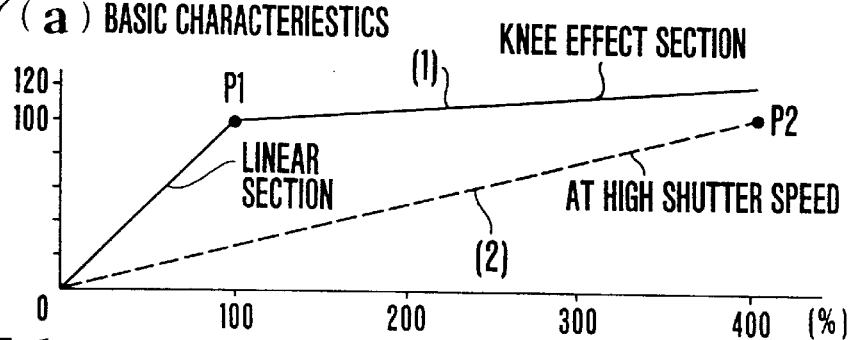
FIG. 7(a) BASIC CHARACTERISTICS
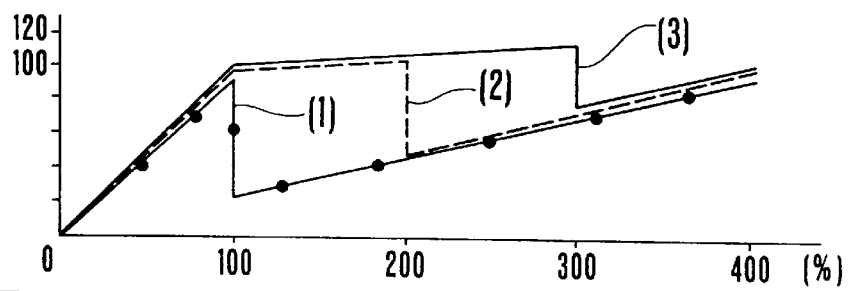
FIG. 7(b) THRESHOLD CHANGE
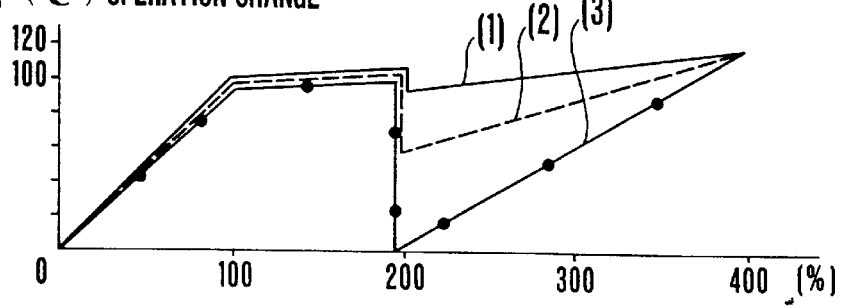
FIG. 7(c) OPERATION CHANGE
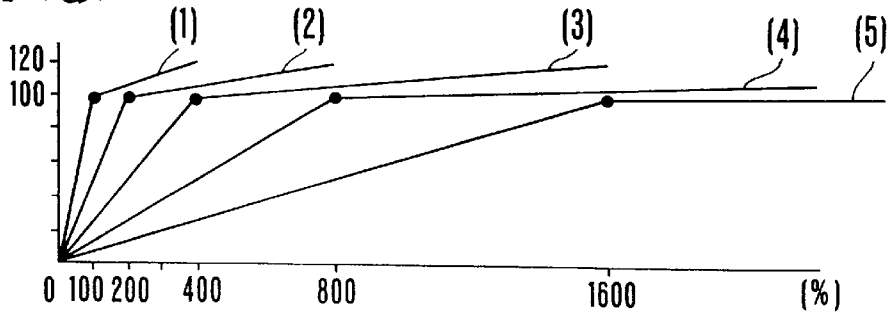
FIG. 7(d) SHUTTER SPEED CHANGE FIG.8
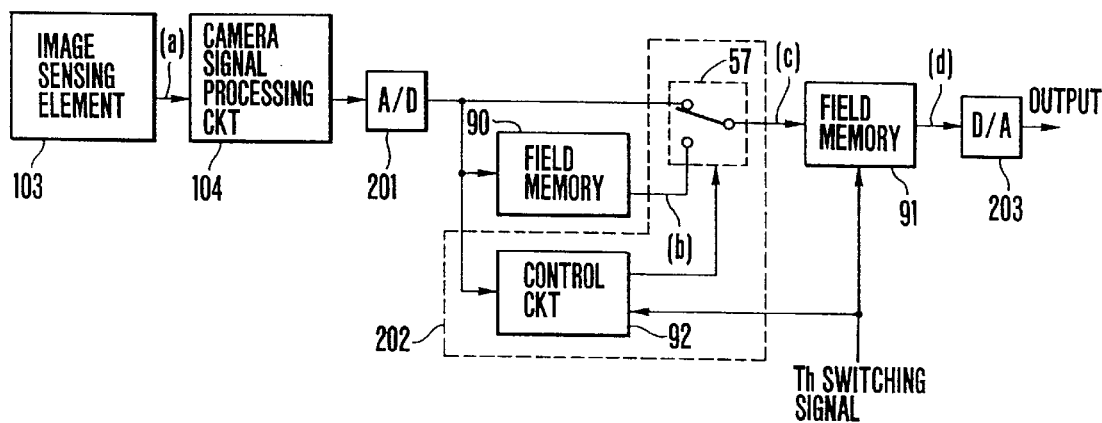
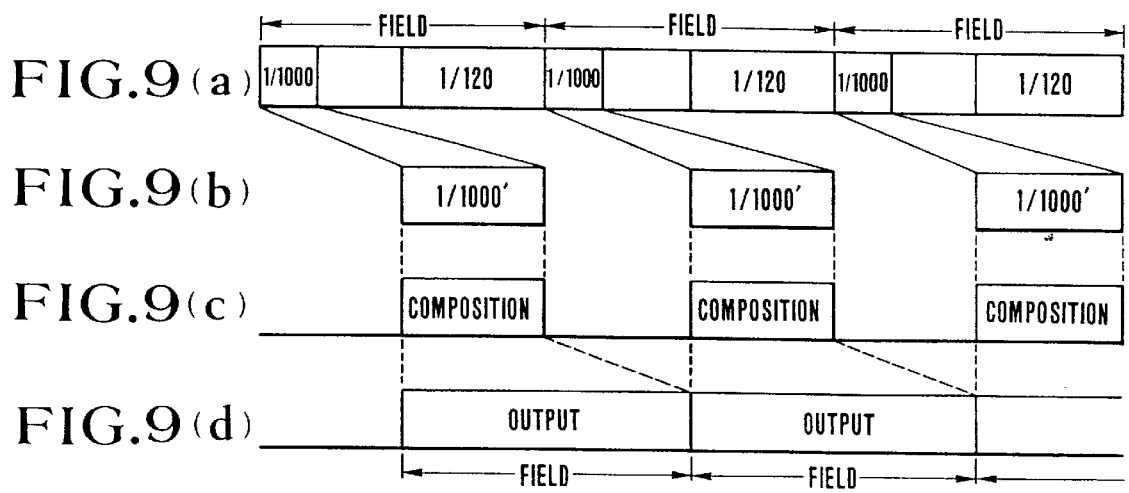

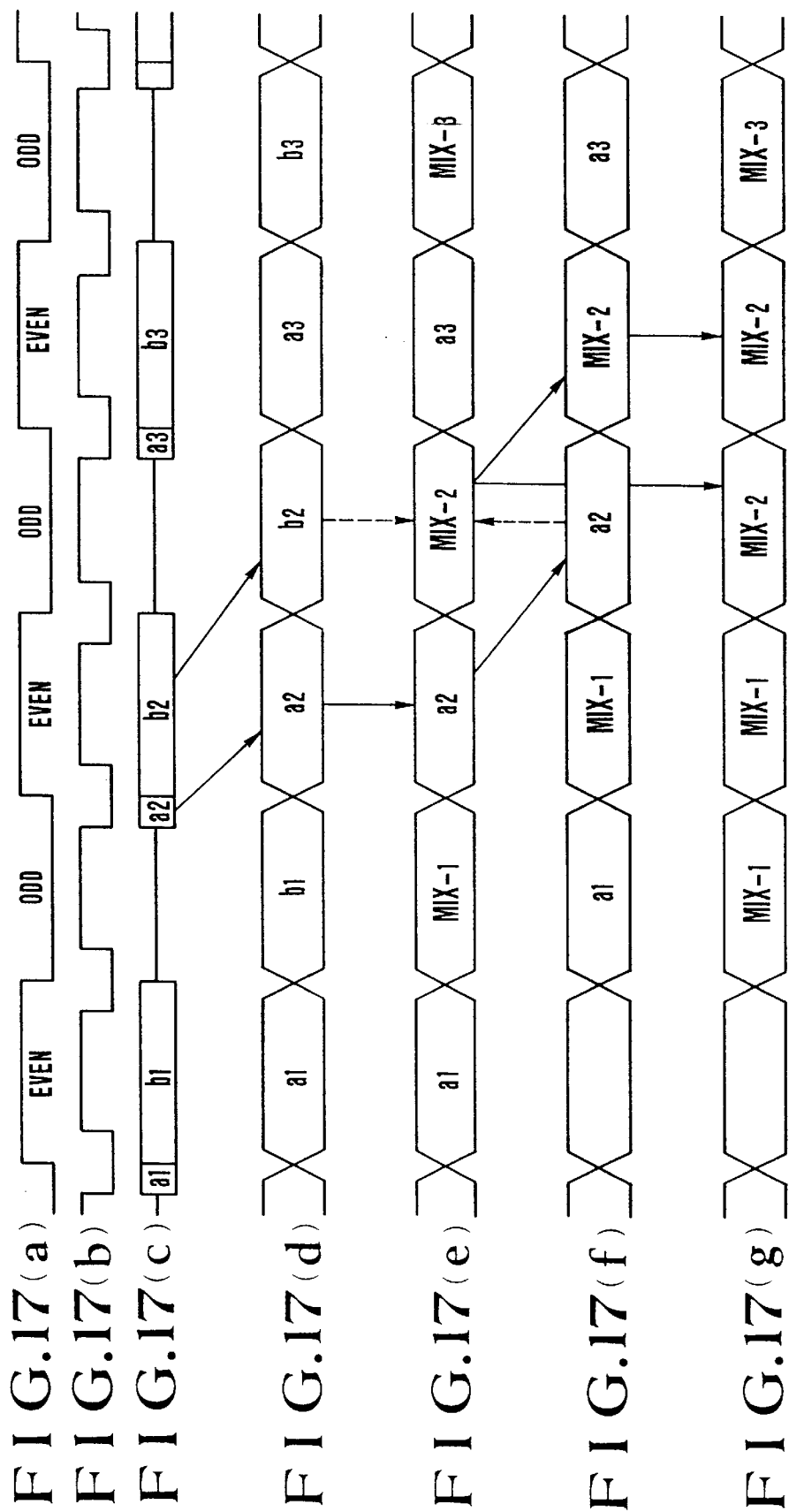

IMAGE SENSING DEVICE

This application is a continuation, of application Ser. No. 08/386,119, filed Feb. 9, 1995, now U.S. Pat. No. 5,638,118, which is a continuation of Ser. No. 08/260,038, field Jun. 15, 1994, abandoned, which is a continuation of Ser. No. 08/219,747, filed Mar. 29, 1994, abandoned, which is a continuation of Ser. No. 07/935,046 filed Aug. 25, 1992, abandoned, which is a division of Ser. No. 07/601,014, filed Oct. 19, 1990 (U.S. Pat. No. 5,162,914), which is a continuation of Ser. No. 07/202,115, filed Jun. 3, 1988 (abandoned).

BACKGROUND OF THE INVENTION

1. Field of the Invention

This invention relates to an image sensing device with a wide substantial dynamic range.

2. Description of the Related Art

Image sensing devices are being widely used, for example, as the video camera sections of video tape recorders with integrated cameras or as still video cameras. A video camera using an image pick-up tube or a solid image sensing element has a relatively narrow dynamic range as compared with the conventional silver halide photography system, so that it is subject to generation of white blankings and blackenings (common names for portions with excessively high or low luminance) under back light conditions. In conventional video cameras, adjustment of the quantity of light in such cases is effected by opening the diaphragm two steps or so, either manually or with a backlighting compensation button.

However, even when such backlighting compensation is appropriately conducted, with the main subject being properly exposed, white blankings may be generated in the background, leaving the picture with a blank background. In other words, the narrowness of the dynamic range in an image sensing device cannot be overcome merely by adjusting the quantity of light to attain a proper exposure for the main subject, as in the case of conventional devices. To cope with this, an improvement has been proposed in the conventional image sensing device of the type in which a still image is transduced into an electrical signal by means of a line scanner or the like. According to this improvement, a plurality of images of different exposures obtained from the same subject are combined to compose a single picture. Similar ideas are disclosed, for example, in U.S. patent application Ser. No. 792,768 and Japanese Laid-Open Patent Application No. Sho 61-219270.

However, they are directed to still images and are not capable of providing a moving picture with a wide dynamic range.

SUMMARY OF THE INVENTION

In view of this problem, it is an object of this invention to provide an image sensing device which has a wide substantial dynamic range and which makes it possible to obtain moving pictures.

Another object of this invention is to provide an image sensing device which permits the exposure control and focusing control to be conducted in an appropriate fashion.

To attain the above objects, an embodiment of this invention comprises image sensing means, control means adapted to cause a plurality of pictures of different exposures to be output successively from the image sensing means and composition means adapted to combine pictures with different exposures from among the ones output from the image sensing means to compose a moving picture.

This construction makes it possible to obtain a plurality of images of different exposures successively, so that by effecting the composition by means of the composition means in a time less than the time between successive video frames, composed moving picture of a proper exposure can be obtained. The speed of the composition operation performed by the composition means can be set sufficiently high, so that there is no problem in this regard.

Another embodiment of this invention consists of an image sensing device adapted to compose an appropriate single picture out of a plurality of pictures of different exposures obtained from the same subject, the image sensing device being characterized by the fact that the camera operation is controlled using a signal indicative of one of the plurality of pictures of different exposures as the reference signal.

The control operations for the camera such as the exposure control and focus adjustment are thus conducted using the signal indicative of one of the plurality of pictures of different exposures as the reference signal, whereby correct camera operation can be assured, without any destabilization thereof.

A further embodiment of this invention consists of an image sensing device adapted to obtain an appropriate picture out of a plurality of images of different exposures obtained from the same subject, the image sensing device being characterized by the fact that the processing of the target picture element is effected taking into consideration the information on the picture elements around the target picture element.

This device thus provides a dynamic range which substantially includes the plurality of images of different exposures, so that it can give a satisfactory image both of the main subject and the background. Further, the number of isolated points is reduced by processing the target picture element taking into consideration the information on the picture elements around the target one, whereby a more correct distinction is attained between the main subject and the background.

A still further embodiment of this invention consists of an image sensing device comprising image sensing means, a control means adapted to cause video signals indicative of a plurality of pictures of different exposures obtained from the same subject to be output from the image sensing means, an image memory capable of storing some of the video signals indicative of the plurality of pictures output from the image sensing means and arithmetic processing means which is adapted, whenever the signal of a target picture element on any picture is judged to be inappropriate, to select or process signals indicative of a plurality of other pictures corresponding to the target picture element to generate an output picture element signal.

Thus, by causing video signals indicative of a plurality of pictures of different exposures to be output from the image sensing means and storing the video signals temporarily in the image memory, it is made possible to discriminate the picture elements of an appropriate exposure from those of an inappropriate one and to replace the picture elements of an inappropriate exposure with the picture elements of an appropriate one by replacing the video signal of the former with the corresponding signal of a picture taken under a satisfactory exposure. Consequently, an appropriate image can be obtained over a wide exposure range, which means that the dynamic range of the image sensing means has been substantially enlarged.

A still further embodiment of this invention consists of an image sensing device equipped with an image sensing means which is adapted to output image sensing signals of different charge storage times by switching for each field and that is characterized by the fact it composes a single picture out of successive pictures of two fields.

By thus composing a picture of image sensing signals of different charge storage times, an image sensing signal of a substantially wide dynamic range can be obtained.

A still further embodiment of this invention consists of an image sensing device for obtaining a single picture out of a plurality of pictures of different exposures derived from the same subject by a switching operation, the image sensing device being characterized in that a single picture selection color signal is generated from a plurality of picture selection luminance signals and based on said single picture selection color signal, color signal data are selected.

By thus composing a picture of image sensing signals of different charge storage times, an image sensing signal of a substantially wide dynamic range can be obtained.

A still further embodiment of this invention consists of a method of controlling an image sensing device provided with a first image sensing mode in which light storage operations of n seconds duration are repeated to form a video signal and a second image sensing mode in which n-second light storage operations and m-second light storage operations (m being less than n) are alternated to form a video signal for a single picture, the controlling method being characterized in that a switching signal for the first and second image sensing modes and a picture element composition control signal for the n-second storage pictures and m-second storage pictures in the second image sensing mode are formed out of the n-second storage pictures.

By thus forming out of the n-second storage pictures in the normal first image sensing mode a switching signal for the first and second image sensing modes and a picture element composition control signal for the n-second storage pictures and the m-second storage pictures in the second image sensing mode, a first image sensing mode with no deterioration in the time resolution is selected, and the picture element composition in the second image sensing mode is made as free from deterioration of time resolution as possible.

Further objects and features of the present invention will be apparent from the following description and drawings.

BRIEF DESCRIPTION OF THE DRAWINGS

FIGS. 4(a) and 4(b) are conceptional drawings showing the first and second examples, respectively, of the image processing in accordance with the present invention.

FIGS. 5(a) and 5(b) are block diagrams showing the first and second examples, respectively, of the arithmetic circuit 202 in FIG. 1.

FIGS. 6(a), 6(b) and 6(c) are views illustrating the method of determining the threshold for judging white blankings and blackenings.

FIGS. 7(a) to 7(d) are tonal characteristic drawings.

FIG. 8 is a block diagram of the essential part of the second embodiment of this invention.

FIGS. 9(a) to 9(d) are timing charts thereof.

FIGS. 17(a) to 17(g) are timing charts of FIG. 15.

DETAILED DESCRIPTION OF THE PREFERRED EMBODIMENTS

Figure 1:
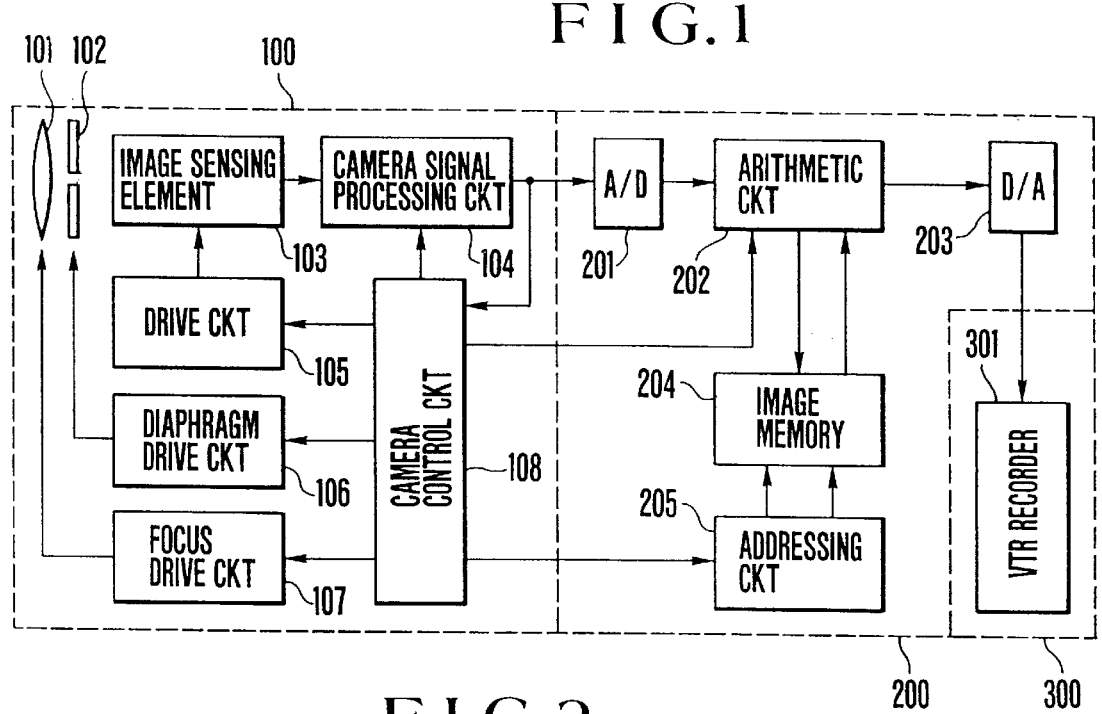
FIG. 1 is a block diagram of a video tape recorder with an integrated camera using the first embodiment of this invention.

The first embodiment of this invention will now be explained with reference to the drawings. FIG. 1 is a block diagram of an entire video tape recorder with an integrated camera to which the present invention is applied.

In FIG. 1, a camera section is shown at 100, a processing section at 200 and a recording section at 300. In the camera section 100, an incident light beam entering through an optical system 101 is restricted in intensity by means of a diaphragm 102 and forms an image on an image sensing element 103. The image sensing element 103 is composed of semiconductor elements such as MOS and CCD. A focus drive circuit 107, a diaphragm drive circuit 106 and an image sensing element drive circuit 105 drive the optical system 101, the diaphragm 102 and the image sensing element 103, respectively. A camera signal processing circuit 104 is a well known circuit adapted to perform γ correction, etc., like the camera signal processing circuit of an ordinary video camera.

The image signal output from the camera section 100 is converted into a digital signal by an A/D converter 201 in the processing section 200 and undergoes a picture element transduction operation, which will be described later, in an arithmetic circuit 202. Then, it is restored to an analog signal by a D/A converter 203 and supplied to the recording section 300. At 204 is shown an image memory for the operation in the arithmetic circuit 202, and at 205 an addressing circuit thereof. The addressing circuit 205 outputs address control signals for writing and reading at the image memory 204 in accordance with a timing signal from a control circuit 108 in the camera section 100.

In the recording section 300, the analog signal from the D/A converter 203 is recorded in a video tape recorder 301 in a well known manner.

Figure 2:
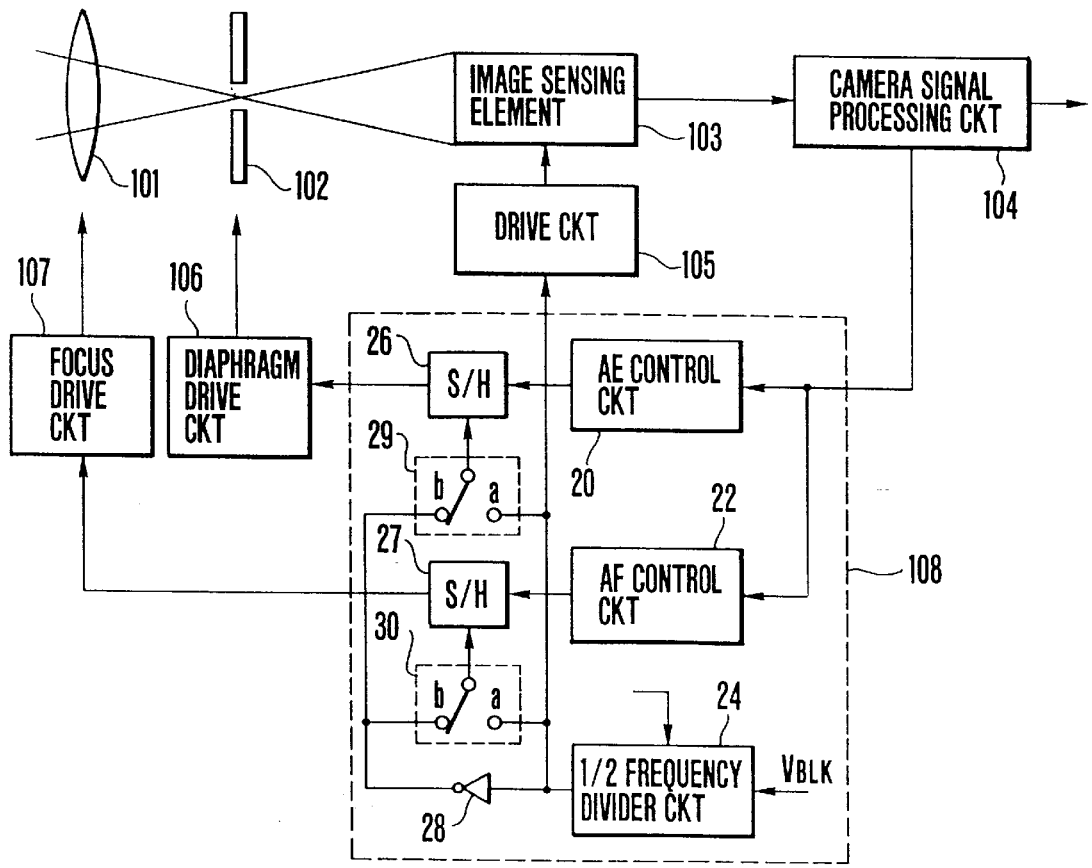
FIG. 2 is a block diagram of the control circuit 108 of the camera section of the device shown in FIG. 1.
Figure 3:
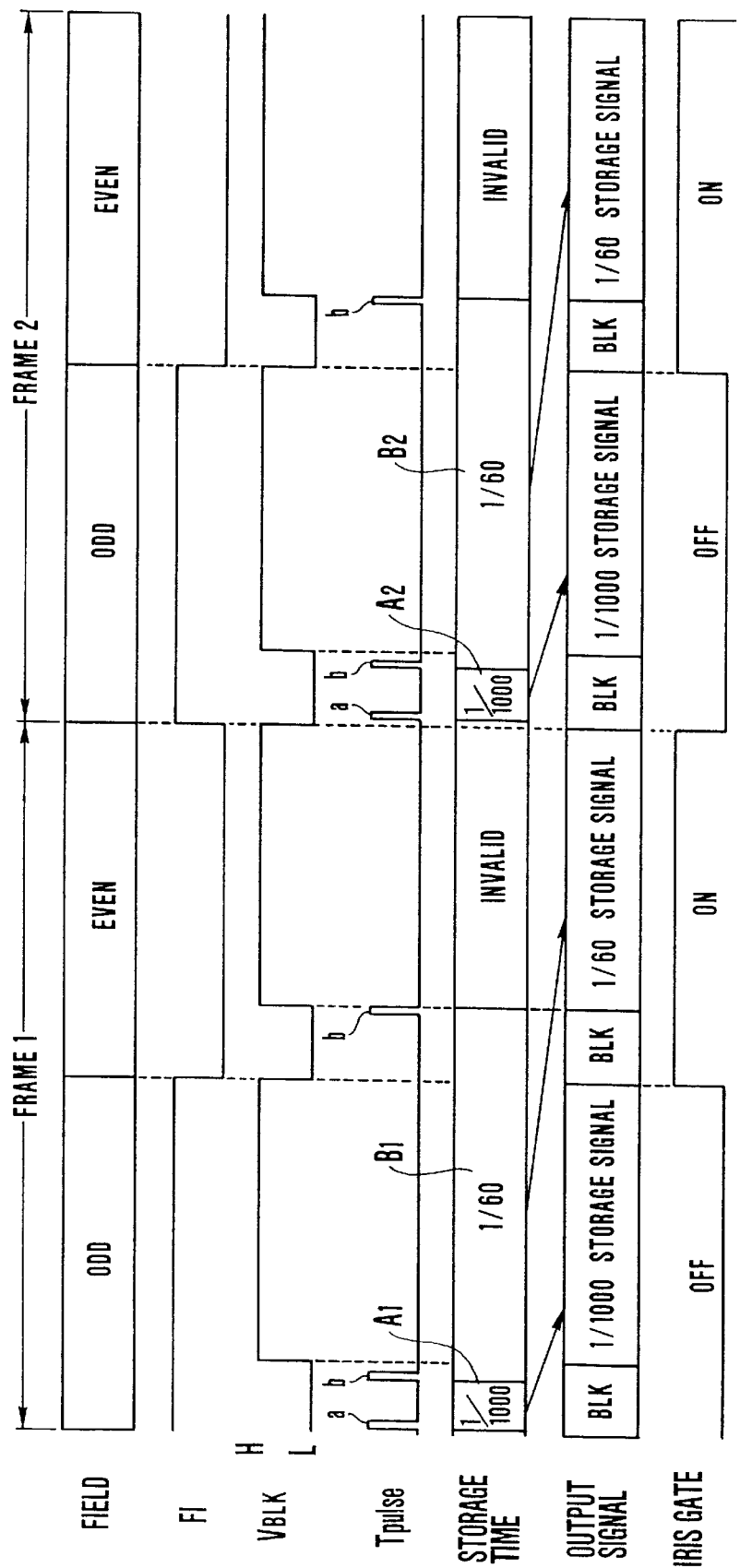
FIG. 3 is a timing chart of the image sensing element operation.

Next, the operation of the image sensing element 103 will be explained. FIG. 2 is a block diagram showing the camera section 100 in more detail, and FIG. 3 is a timing chart of the camera section 100, taking the NTSC signal as an example.

A field index (FI) signal is a signal for distinguishing between odd and even fields composing one frame. The $V_{BLK}$ signal is a vertical blanking signal; the high (H) period of the signal corresponds to the effective picture and the low (L) part thereof corresponds to the vertical blanking period. TPULSE is a signal for controlling the charge storage time of the image sensing element 103; for example, in the case of an interline type CCD image sensing element, it is a pulse for reading out the picture element output to the CCD for vertical transmission. During the period between a and b of $T_{PULSE}$, the charge in the CCD for vertical transmission is reversely transmitted to the upper drain, and during the period between b and b or that between b and a, the charge in the CCD for vertical transmission is transmitted to a horizontal shift register at a rate fast enough to support television transmission. An iris gate signal is a signal for specifying whether the storage signal of 1/1000 sec. or that of 1/60 sec. is to be selected as the reference signal for the automatic exposure, which is to be described later.

In the example shown here, a 1/1000 sec. storage is performed during the vertical blanking period and the 1/1000 sec. storage signal is output during the next effective picture period. Immediately after the 1/1000 sec. storage period, a charge storage of substantially 1/60 sec. is effected to output the 1/60 sec. storage signal during the effective picture period of the next field. In this way, two types of storage time signals (1/1000 sec. and 1/60 sec.) are alternately output.

In FIG. 2, a well known AE control circuit is shown at 20 which is adapted to receive a signal (for example, an image signal) from the camera signal processing circuit 104 and output the control signal for exposure control. Also shown in FIG. 2 are a well known AF control circuit 22 adapted to output the control signal for focusing control, a ½ frequency divider circuit 24 adapted to divide the frequency of the vertical blanking signal $V_{BLK}$ by two, sample-and-hold circuits 26 and 27, an inverter 28 and manual switches 29 and 30 for selecting between the two alternatives, i.e., whether the sampling timing is to be determined by the output of the ½ frequency divider circuit 24 or by the signal reversed at the inverter 28. The output of the sample-and-hold circuits 26 and 27 are respectively applied to the diaphragm drive circuit 106 and the focus drive circuit 107 to execute automatic exposure control and automatic focus adjustment.

As discussed above, in accordance with this invention, the signals indicative of a plurality of pictures of different exposures can be obtained in one field, so that the camera signal processing is partly changed. The AE processing will be explained with reference to FIG. 2. A signal derived from the image sensing element 103 is transmitted from the camera signal processing circuit 104 to the AE control circuit 20 for AE control, and the AE control circuit 20 supplies a control signal to the diaphragm drive circuit 106 so that the AE control servo loop may operate. This control signal varies in such a manner that the output of the image sensing element 103 may be kept within an appropriate dynamic range, i.e. the diaphragm 102 may be narrowed when light and widened when dark.

When, however, the quantity of light changes, for example, with a period of each field, a proper AE operation is not to be expected. For, the response of the AE servo takes a rather long time as compared with the change in the period of the field or the frame. Therefore, the control signal for the AE operation is to be restricted in such a manner that only one of the two pictures of different exposures which are obtained alternately may be employed. In FIG. 2, the sample-and-hold circuit 26 is provided and the sampling timing is determined by the switch 29 in such a manner that only such a control signal as corresponds to one of the two pictures (for example, that of 1/60 storage time) may be selected.

In FIG. 2, the sampling pulse is formed by the vertical blanking signal ($V_{BLK}$), and a signal which is reversed for each $V_{BLK}$ signal is formed by the ½ frequency divider circuit 24. The signal thus formed is connected to the contact a of the switch 29, and the signal obtained by reversing the output of the frequency divider circuit 24 at the inverter 28 is connected to the contact b of the switch 29. Accordingly, by selecting the contact a of the switch 29, the sampling pulse for using the 1/1000 sec. storage signal of an odd field as the reference for the AE loop control is applied to the sample-and-hold circuit 26. When, on the other hand, the contact b is selected, the sampling pulse for using the 1/60 sec. storage signal of an even field as the reference for the AE loop control is applied to the sample-and-hold circuit 26. The same may be said of the AF control circuit 22 for the AF control, the sample-and-hold circuit 27 and the switch 30.

In this embodiment of the present invention, a combination of 1/1000 sec. storage time and 1/60 sec. storage time and the quantity of light changes by about four steps ($2^4$ times), so that in the case of a camera using a CCD image sensing element, an exposure adjustment to the subject using the 1/60 sec. storage time in an even field as the reference will lead to tendency to generate background white blankings in that even field, and in the case of an odd field with a light quantity diminished by four steps, subject blackenings will often be generated. In this example, a case is assumed where the exposure is adapted to the background under a back light condition, and the setting may naturally be made at a storage time other than 1/1000 sec., according to the situation.

Figure 4A:
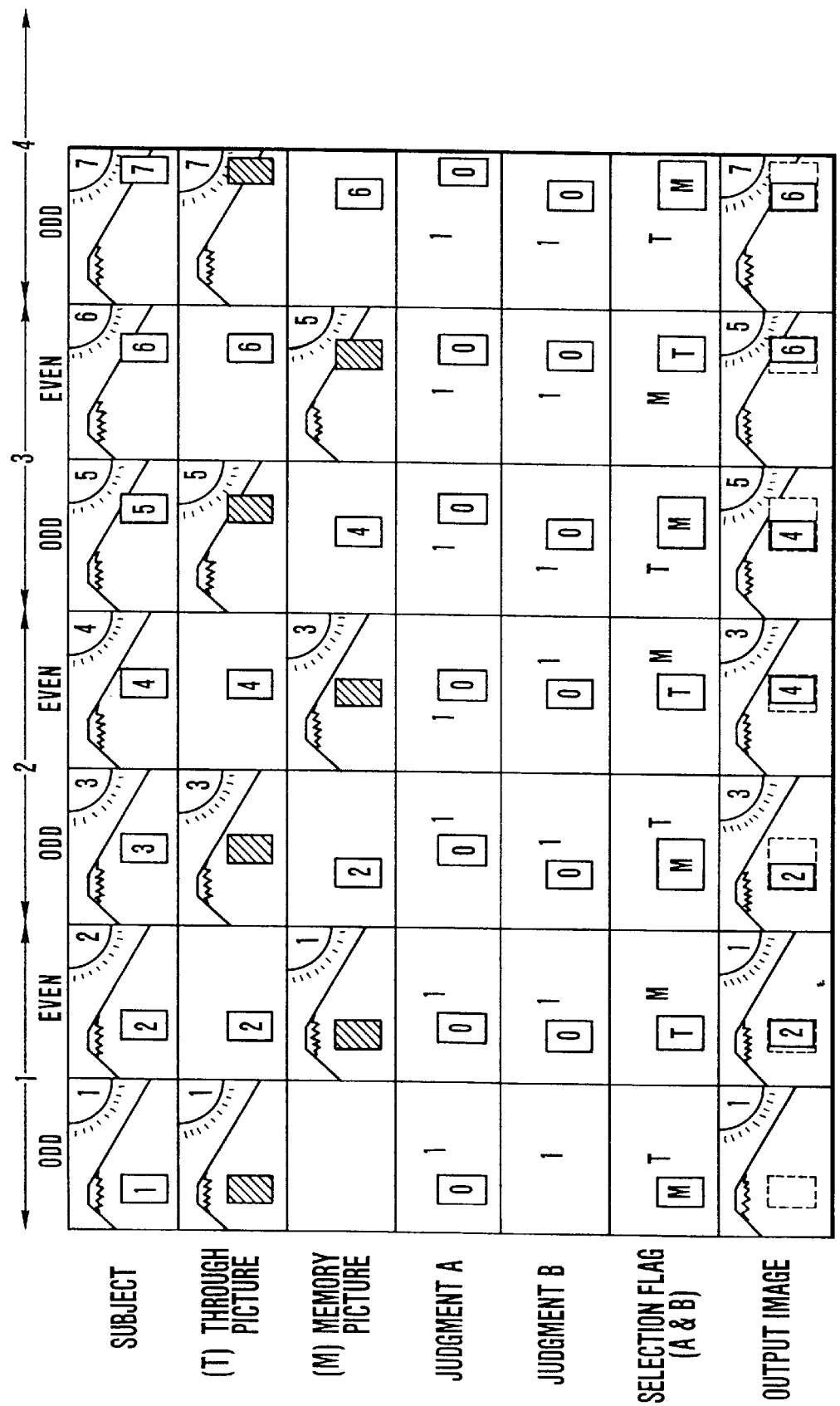

This invention utilizes such white blankings and/or blackenings in one of the two types of fields in order to improve the picture quality. In other words, parts generating white blankings or blackenings are replaced with the corresponding parts in the other field (containing no blackening or white blanking because of the difference in exposure), the signals of both fields being combined to compose a final image signal. The basic idea in this regard will be explained with reference to FIG. 4(a). In FIG. 4(a), the main subject is represented by an upright rectangle. A through (T) picture here means a real-time output from the image sensing element 103, and a memory (M) picture or memory output means the signal of an immediately foregoing field stored temporarily in the image memory 204. The through pictures show the main subject as blackened for each odd field and as blanked for each even field. Further, since the memory pictures are composed of signals delayed by one field period, they show white blankings and blackenings in different fields from those of the through pictures.

Consequently, an appropriate combination of the through pictures and the memory pictures will provide a satisfactory image which is free from both white blankings and blackenings. In other words, the signals of the through and memory pictures are compared with a predetermined threshold; they are arbitrarily assigned the value "1" when they are greater than this threshold, and the value "0" when smaller, thus enabling a designation of white blankings and blackenings for each picture element. FIGS. 6(a) and 6(b) show the relation between the threshold and the luminance values of picture elements and their fields. The abscissa in FIG. 6(a) denotes the luminance levels and the ordinate denotes the frequency of appearance of the luminance levels in a picture. As shown in FIG. 6(a), the threshold Th1 is so set that luminance levels exceeding it define blackenings, and the threshold Th2 is so set that luminance levels exceeding it define white blankings. In other words, luminance levels lower than the threshold Th1 are judged to be blackenings and those higher than the threshold Th2 are judged to be white blankings. FIG. 6(b) shows the relation between the fields and the thresholds. As explained above, the white blankings and blackenings alternate in the odd and even fields, so that the thresholds for their designation also alternate with each field.

In this ways it can be judged which of the picture elements in each field shows a blackening or white blanking, and the result of the judgment can be utilized to select a picture element of a proper exposure from between the through and the memory pictures. For example, by obtaining the logical product of the judgment A and the judgment B, i.e., the product of the assigned values of the through and memory picture, and selecting, in the case of odd fields, the through picture signal for a picture element the logical product of which is "1", and the memory picture signal for a picture element the logical product of which is "0", and vice versa, in the case of even fields, the selection flags as shown in FIG. 4(a) are obtained. The pictures shown in the lowest row in FIG. 4(a) correspond to what has been composed based on the selection flags. As shown in this figure, a case was assumed in which the main subject underwent a uniform motion to check the influence of the time axis deviation on the image; such a deviation proved to be negligible in practice.

FIG. 5(a) is a block diagram showing in detail that circuit part of the arithmetic circuit 202 in the processing section 200 in which the comparison of the above thresholds Th1 and Th2 with the picture signals and the formation of selection flags are effected. A Th switching control signal is a signal the "H" and "L" of which are reversed for each field, as in the case of the FI signal, and transmitted through a threshold generating circuit 53 and an inverter 51, to be applied to a second threshold generating circuit 52. The threshold generating circuits 52 and 53 generate, in accordance with their switching signals, the threshold Th1 or Th2 in the relation shown in FIG. 6(b). Comparison circuits 54 and 55 compare the memory and through pictures with the thresholds from the threshold generating circuits 52 and 53 and issue signals A and B as the judgment results. An AND gate 56 takes the logical product of the signals A and B and outputs a selection flag signal. The switch 57 changes its position in accordance with said flag signal to perform the selection between the memory and the through picture signals.

FIG. 5(b) is a block diagram showing another example of the configuration of that circuit part of the arithmetic circuit 202 in the processing section 200 in which the signal comparison with the above thresholds Th1 and Th2 and the selection flag formation are carried out. Switches 501 and 502 have their positions changed by a switching control signal the "H" and "L" of which are reversed for each field (the FI signal, for example). In the example shown, the switch 501 is connected with the contact b during an "H" period, the switch 502 then being connected with the contact M. During an "L" period, the switch 501 is connected with the contact a, whereas the switch 502 is controlled also by the output of an AND circuit 507. Two threshold generating circuits 503 and 504 generate the thresholds Th1 and Th2, respectively, which are shown in FIG. 6(a). A comparison circuit 505 compares the output signal from the memory 204 (memory out) with the threshold Th1 to output the judgment B, whereas a comparison circuit 506 compares the output signal of the A/D converter 201 (through picture) with the threshold Th2 to output the judgment A. The AND circuit 507 takes the logical product of the comparison circuits 505 and 506 and outputs it as a selection flag. As explained above, the switch 502 is controlled by the output of the AND circuit 507.

FIG. 4(b) shows the operation of a circuit which is of the configuration shown in FIG. 5(b). In this figure, "memory in" means a picture which is written to a field memory (the memory 204 in FIG. 5(b), and the "memory out" means a picture which is read out of the above memory. During an odd field period, the through picture (T) is directly written to the memory 204, whereas during an even field period, the through picture (T) and the odd field picture which is one field before it, which is a memory out, are combined after a predetermined weighing and written to the memory 204.

When composing signals of different storage times shown as A and B in the storage time column in FIG. 3, the composition is effected by combining two pictures such as A1 and B1, A2 and B2, and a picture composed of such a combination as B1 and A2 is avoided. By doing so, the storage periods for obtaining two pictures to be combined become close to each other, so that a composed picture with few blurs can be obtained.

Further, during an even field period, the threshold Th1 is compared with the memory out, and the threshold Th2 with the through picture; when the input data are greater than the thresholds, the value assigned is "1", and when smaller, the value assigned is "0". Then they are output as the judgments A and B for the above through picture (T) and the memory out, respectively.

In accordance with these picture element judgments, signals are selected from the image signals shown as part of the through picture (T) and the memory out for each picture element area. The result of the selection is represented by the even field period pictures shown in the lowest column in FIG. 4(b). During an odd field period, an output image (memory out) which is one field period before it is output again. By thus performing picture composition using pictures which are close to each other in respect of time, image deterioration in border areas can be avoided even for moving objects.

A picture with clear differences in luminance may be divided into two areas, i.e., the subject and the background. In such a case, it is desirable that in each of the areas, only the signals of one type of storage time be used, avoiding a change in storage time within a single area. This is partly because a proper tonal expression would then be hindered in that area and partly because the border portions between the different storage times in each area flicker, resulting in a picture that may be irritating to watch. Accordingly, in order to avoid effecting such a change frequently, it is desirable that a threshold to be used as a reference for the change be set, taking into consideration the information on the peripheral picture elements. In view of this, the thresholds Th1 and Th2 may be provided with hysteresis characteristics, as shown in FIG. 6(c). In other words, the threshold generating circuits 52 and 53 shown in FIG. 5(a), for example, may be so designed that they generate, in accordance with their switching signals, the thresholds Th1, Th1', or Th2, Th2', in the relation shown in FIG. 6(c). The above hysteresis characteristics may be such that when picture element information with a value below the Th1 in FIG. 6(c) is received, the threshold Th1 is raised to Th' (Th' being greater than Th1) and the output of the comparison circuits 54 and 55 is prevented as far as possible from being reversed. When, however, the output of the comparison circuits 54 and 55 has been reversed, the threshold Th1' is restored to Th1. The same can be said of Th2; when information with a value above Th2 is received, the threshold Th2 is lowered to Th2' (Th2' being less than Th2). By doing this, the distinction between the subject and the background can be made more correct, the isolated points in the picture resulting from the judgment being reduced, which makes it possible to effect a more natural picture composition. Also, the border portions between the subject and background become less subject to flickering, whereby a more natural image can be obtained.

FIGS. 7(a) to 7(d) are tonal characteristic drawings. The full line in FIG. 7(a) represents the characteristics of an ordinary video camera; up to 100%, the input and output are shown as linear. For an input beyond that value (100 to 400%), the characteristics are illustrated with a smoothly inclined line; the relation is called a knee effect. Suppose the point where such a change begins is P1; the point will then move to the position P2 when the shutter speed is high. Here, it is to be assumed that P1 represents an exposure of 1/60 sec. and P2 that of 1/250 sec. obtained by a two step exposure change. When there is a difference of four steps, as in the case described above, the relation may be represented by the lines (1) and (5) in FIG. 7(d). In this figure, the line (1) represents 1/60 sec., the line (2) 1/125 sec., the line (3) 1/250 sec., the line (4) 1/500 sec. and the line (5) 1/1000 sec. In accordance with this invention, a characteristic with a desired curve can be composed out of two characteristics with different inclinations. Examples of such a composition is shown in FIGS. 7(b) and 7(c).

The method of composing tonal characteristics will now be explained in detail. By way of example, a case will be taken where it is so controlled that either the point P1 representing the change from the linear to the knee effect section (when the shutter speed is low) or the point P2 (when the shutter speed is high) reaches the 100% point. Thresholds are provided as shown in FIG. 6(a) so as to perform judgment over white blankings and blackenings on pictures, the tonal characteristics varying with the setting of the thresholds. The variation is shown in FIG. 7(b), in which the characteristics (1) to (3) show how the position where the high shutter side is selected in switching picture elements with the switch 57 moves to the high luminance side when the threshold Th2 for judging white blankings is gradually raised.

While in FIG. 5(a) one of the two types of picture element signals is selected with the switch 57, it is also possible to obtain the desired signal by processing the data on the corresponding two picture elements. In connection with this method, FIG. 7(c) shows, by way of example, the change in characteristics when different operation methods are selected, with the characteristic (2) in FIG. 7(b) being used as the reference. The characteristic (2) in FIG. 7(c) is identical with the characteristic (2) in FIG. 7(b). The characteristic (1) in FIG. 7(c) represents the case where mean value processing is performed using the picture element data of a picture which has been judged to contain white blankings and the corresponding picture element data of another picture. The characteristic (3) represents the case in which subtraction processing is performed. Suppose, for example, the data on two corresponding picture elements judged to contain white blankings are D1 and D2, and the processing result is D, D=(D1+D2)/2 with mean value processing and D=D1−k (D1−D2) with subtraction processing, where k varies in accordance with the threshold set. In the case of the characteristic (3) in FIG. 7(c), k is about 1.88. Apart from the mean value processing and subtraction processing, what is called off-set processings such as constant addition and constant subtraction may be utilized, or they may be used jointly.

Further, when the subject is properly exposed, the condition of the background image (such as the degree of white blanking) becomes adjustable, so that a more natural representation and an elaborate design can be realized. Naturally, it is also possible to adjust the degree of blackening of the subject, with the background properly exposed. The adjustment range of such image conditions can be utilized within an infinite characteristic range by the picture element operation method as well as by the combination of shutter speeds.

In the above embodiment, the time resolution is substantially 30 pictures per second, which is about the same as a frame storage CCD image sensing element or the like. An embodiment will now be explained, according to which two pictures are taken in a single field, so that a time resolution equal to that of a field storage CCD image sensing element may be realized. The modified sections in the example are shown in FIG. 8 and the timing chart thereof in FIGS. 9(a) to 9(d). In this embodiment, the signal of the image sensing element 103 is read out at a speed higher than that of an ordinary video rate; the signal then undergoes a time axis transduction and is restored to the normal rate. Field memories 90 and 91 are each provided with a memory storage capacity corresponding to the picture information for a single field; in the memory 90, the 1/1000 sec. storage signal is delayed so as to be synchronized with the 1/120 sec. read-out timing, and in the memory 91, the length of the time axis is doubled so as to change the 1/120 sec. picture signal into a 1/60 sec. NTSC signal. FIGS. 9(a) to 9(d) correspond to the signals (a) to (d) in FIG. 8. The switch 57 forms the composition output (c) by switching the 1/120 sec. storage signal and the 1/1000 sec. storage signal in accordance with the output of a control circuit 92. This arrangement enables a resolution for each field to be obtained, as shown in FIG. 9(d).

Figure 10:
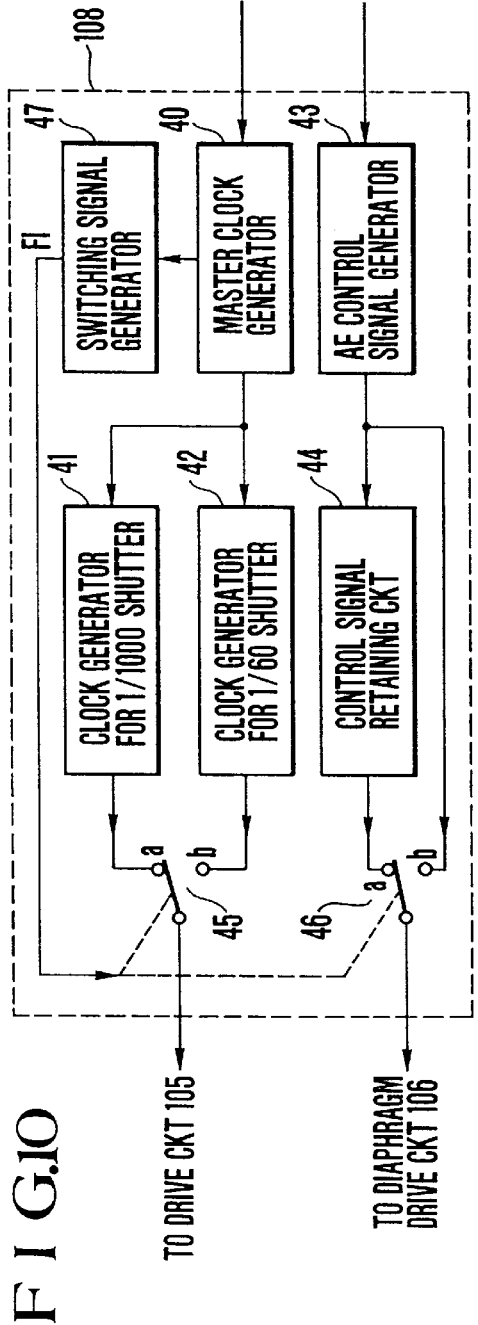
FIG. 10 is a block diagram showing another example of the control circuit 108 in FIG. 1.

FIG. 10 shows in detail another example of the control circuit 108 in FIG. 1. A master clock generator 40 generates master clock signals for the interior of the control circuit 108 in accordance with the reference signal from outside. A clock generator 41 for 1/1000 shutter generates clock signals for high speeds in accordance with the above master clock signals, and a clock generator 42 for 1/60 shutter generates clock signals for low speeds in accordance with the above master clock signals. A switch 45 changes its position for each field and applies the output of the clock generators 41 and 42 alternately to the drive circuit 105. An AE control signal generator 43 generates AE control signals for diaphragm control, based on the image signals from the camera signal processing circuit 104. A control signal retaining circuit 44 retains the AE control signals for the period of one field. A switch 46 changes its position for each field and applies the output of the AE control signal generator 43 and the control signal retaining circuit 44 alternately to the control circuit 106. A switching signal generator 47 controls the switching operations of the switches 45 and 46 for each field. The switches 45 and 46 change their positions synchronously.

In this embodiment, a clock generator is provided for low and high speeds, and the clock signals thereof are changed in accordance with the output signals of a switching signal generator generating signals for each field, so that the circuit configuration and operation are simplified, which is suited to moving pictures.

While in the above embodiments pictures of different exposures are produced by varying the storage time of the image sensing element, it is also possible to attain the production of pictures with different exposures by varying exposure controls such as a high-speed diaphragm or shutter at a high speed. Further, this can also be realized by electrically controlling a dimmer filter, as in the case of PLZT.

As will be appreciated from the foregoing description, the present invention permits the dynamic range to be substantially enlarged, so that even under a back light condition, a properly exposed image in the form of a moving picture can be obtained not only for the subject but also for the background.

Figure 11:
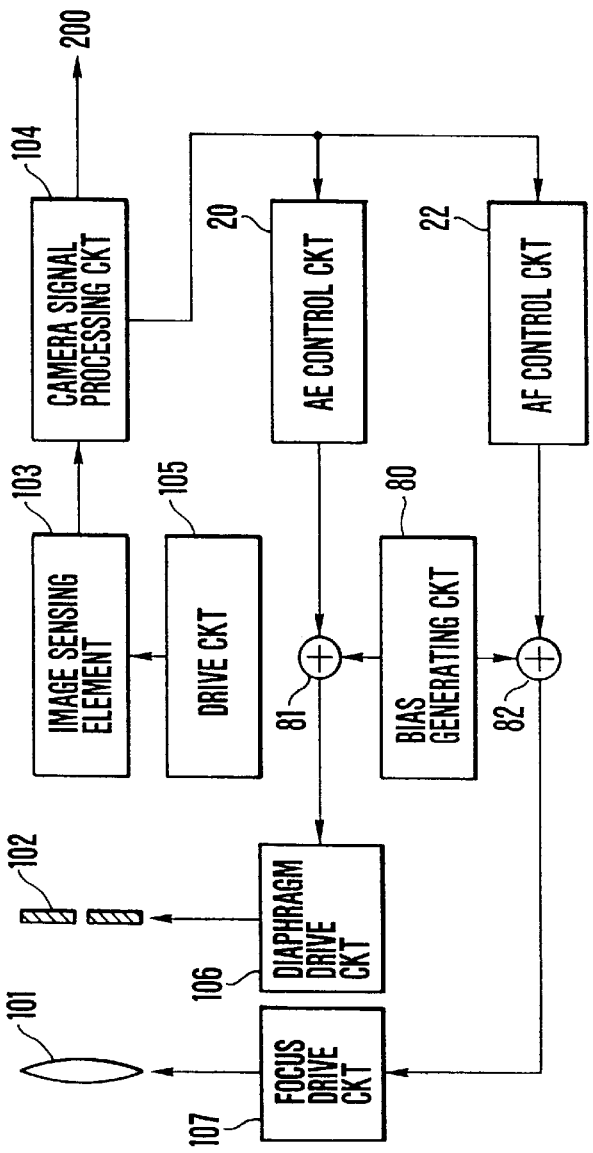
FIG. 11 is a block diagram showing a variation of the circuit shown in FIG. 2.

In the above embodiments, the operation loop of the camera for moving pictures is set in such a manner that the response is of several seconds durations, thus avoiding an abrupt change of pictures. When, for example, the exposure times of 1/1000 sec. and 1/60 sec. are alternated for each field, the same response is shown in the AE loop in FIG. 2 as when the exposure time of 1/250 sec. is adopted throughout. This can be regarded as a stationary error, which can be overcome by adding an offset bias corresponding to the exposure difference, to the AE loop. FIG. 11 shows an example of such a modification of the circuit shown in FIG. 2. In this example, a bias generating circuit 80 generates such biases as discussed above; an adder 81 adds the bias to the AE loop; and an adder 82 adds a similar offset bias to the AF loop. The same can be said of AWB (automatic white balance adjustment). This arrangement makes it possible to stabilize the AE, AF or AWB with a constant servo gain.

Figure 12:
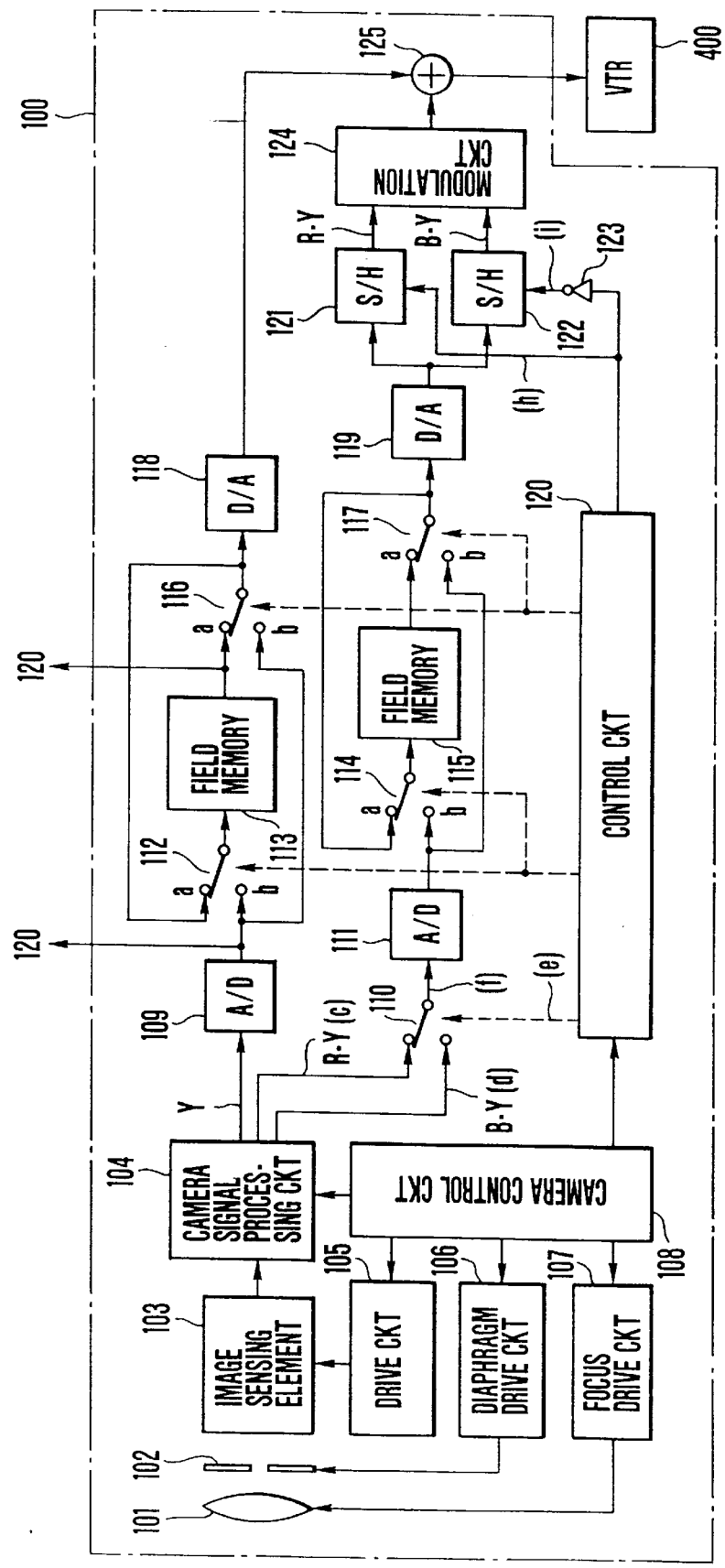
FIG. 12 is a block diagram of a video tape recorder with an integrated camera using the third embodiment of this invention.

FIG. 12 shows a third embodiment of this invention and FIGS. 13(a) to 13(i) show the operational timing thereof. In these figures, what are furnished with the same reference numbers as those in FIGS. 1 to 11 denote the same components. The output of the camera signal processing circuit 104 include the luminance (Y) signal (see FIG. 13(a)), which undergoes sampling at the A/D converter 109 with $4f_{sc}$ ($f_{sc}$ denotes the color subcarrier frequency), and quantization into 8-bit signals and is then supplied to the contact b of a switch 112. To the contact a of the switch 112 is supplied a composed picture, which is the output of a switch 116. The switch 116 changes its position for each field with the FI signal shown in FIG. 3 (or a signal equivalent to this) and connects the contact a for an even field and the contact b for an odd field. The output of the switch 112 is supplied to the contact a of the switch 116 by the memory 113, delayed by one field period. To the contact b of the switch 116 is supplied the output of an A/D converter 109. The position of the switch 116 is changed by the selection flag (see FIG. 4(a)) output from a control circuit 120. The output of the switch 116 is supplied to the contact a of the switch 112, and at the same time, it is converted into an analog signal by a D/A converter 118 and supplied to a mixing circuit 125, where it is mixed with a color-difference signal to be recorded in a video tape recorder 400.

Figure 13:
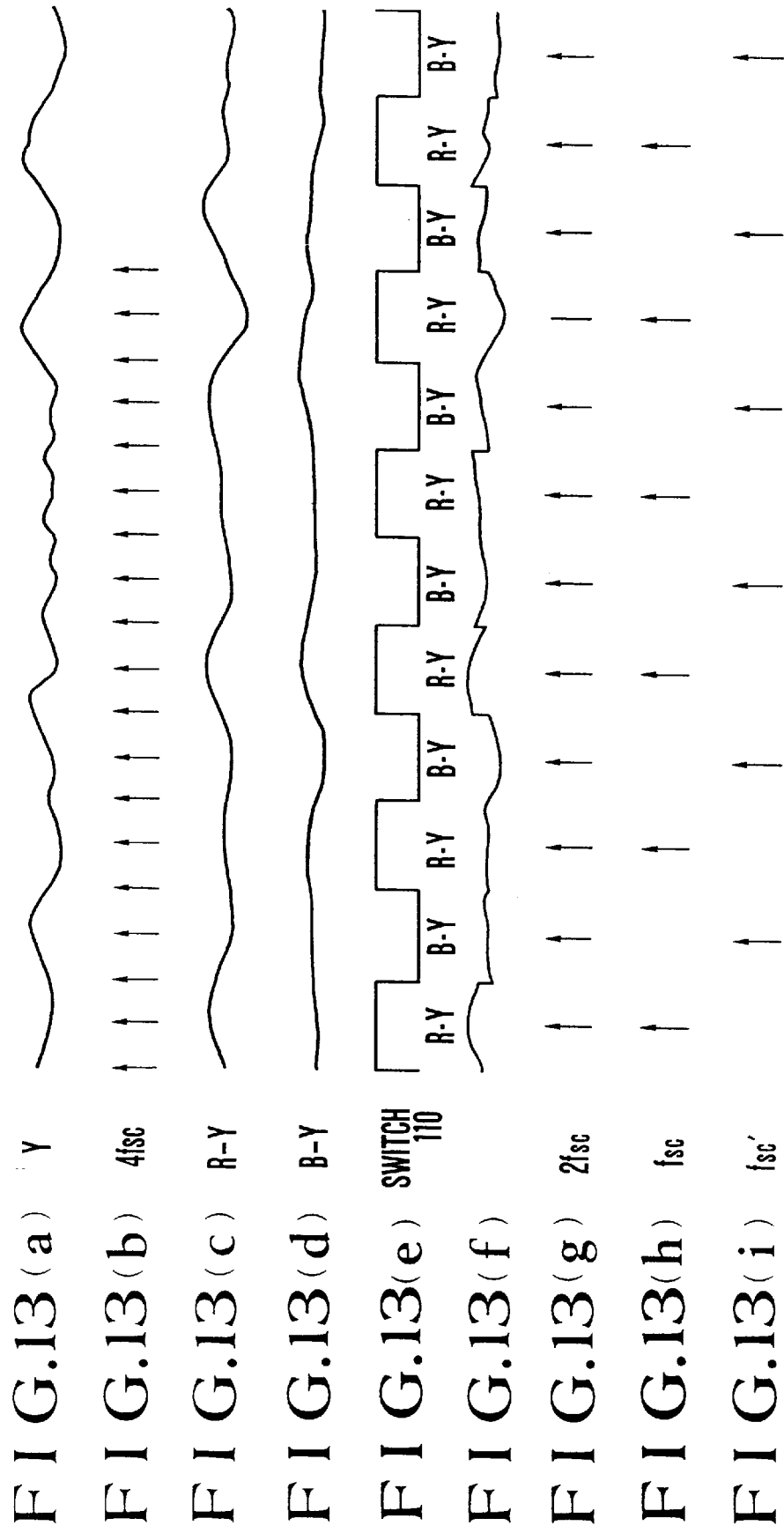
FIGS. 13(a) to 13(i) are diagrams showing the signal waveforms of FIG. 12.

The output of the camera signal processing circuit 104 also includes two color-difference signals (R-Y) and (B-Y) (FIG. 13(c) and FIG. 13(d)), which are switched by a switch 110, with the timing shown in FIG. 13(e). FIG. 13(f) shows the output of the switch 110, which undergoes sampling at an A/D converter 111, with $2f_{sc}$ pulses of the timing shown in FIG. 13(g), and quantization into 8-bit signals, and is then supplied to the contact b of a switch 114. The processing at the switch 114, the field memory 115, the switch 117 and the D/A converter 119 is the same as for the Y-signal, except that the memory capacity of the field memory 115 may be half that of the field memory 113. The output signal of the D/A converter 119 (FIG. 13(f)) is sampled and synchronized by sample-and-hold (S/H) circuits 121 and 122, with the timing shown in FIG. 13(h) and FIG. 13(i). After this sampling and holding, the R-Y signal (FIG. 13(c) and the B-Y signal (FIG. 13(d)), which have been restored to their original state with a low pass filter (not shown), effect quadrature two-phase modulation of the $f_{sc}$ in a modulation circuit 124. The output of the modulation circuit 124 is superimposed on the Y-signal and supplied to the video tape recorder 400, as an NTSC signal.

Figure 14:
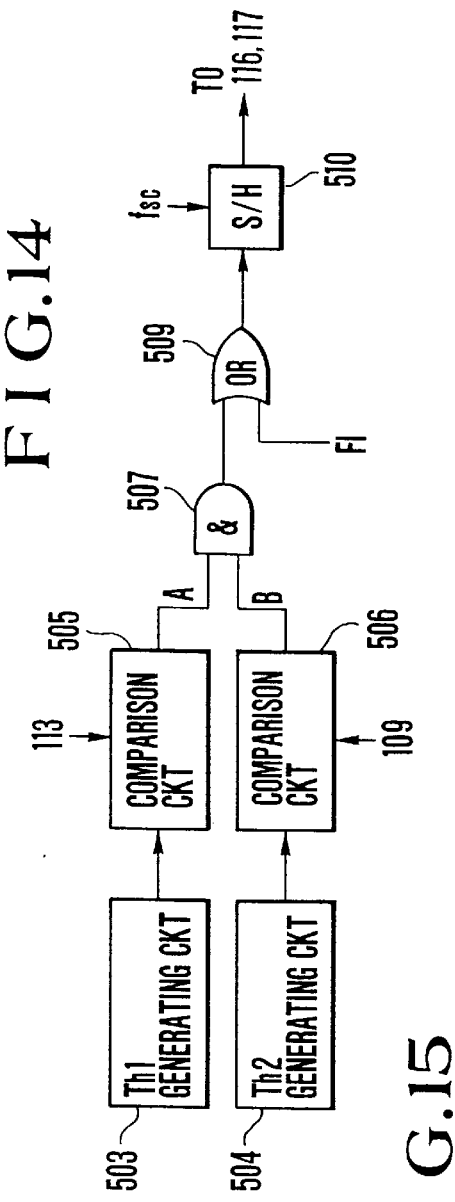
FIG. 14 is a block diagram of a specific configuration of the selection flag section of the control circuit 120 shown in FIG. 12.

FIG. 14 shows that portion of the control circuit 120 where selection flags are generated. Threshold generating circuits 503 and 504 generate the thresholds Th1 and Th2 shown in FIG. 6(a), respectively. A comparison circuit 505 compares the output signal (memory out) of the field memory 113 with the threshold Th1 to output the judgment A, and a comparison circuit 506 compares the output signal (through picture) of the A/D converter 109 with the threshold Th2 to output the judgment B. An AND circuit 507 takes the logical product of the judgments A and B of the comparison circuits 505 and 506 and applies it to one input of an OR circuit 509. To the other input of the OR circuit 509 is applied the FI signal, so that the output of the OR circuit 509 is "H" in an ODD field.

The output of the OR circuit 509 is sampled and held by an S/H circuit 510 with the timing shown in FIG. 13(h) or FIG. 13(i). This is to be effected because of the following circumstances: the sampling frequency is different for the luminance and the color signals, so that when a selection flag is formed with all the luminance signals selected, there occurs the inconvenience that although the output of the A/D converter 109 is selected for the R-Y signal of a sampling point on the picture, the output of the field memory 113 is selected for the B-Y signal in that position. In other words, this inconvenience consists in the fact that the R-Y signal is obtained from one of two pictures of different storage times, and the B-Y signal from the other; as a result, the color signal obtained from the modulation circuit 124 does not correspond to the actual color of the subject. To overcome this problem, this embodiment provides an S/H circuit 510 shown in FIG. 14, with its sampling rate $f_{sc}$. The output of the S/H circuit 510 is applied to the switches 116 and 117, which are placed at the contact a for "H", and at the contact b for "L".

By the above arrangement, this embodiment makes it possible to avoid the error of performing the composition by obtaining the R-Y signal from one of two pictures of different storage times and the B-Y signal from the other.

In the above embodiment, one of the Y-judgment signals (corresponding to the output of the AND circuit 507) is used as the representative value by means of the circuit explained in FIG. 14 in order to produce a single C-selection signal (corresponding to the output of the S/H circuit 510) from among predetermined Y-judgment signals. Apart from this method, the C-selection signal can be produced by majority processing in which the C-selection is effected in accordance with the numerical judgment result, or mean value processing in which the mean value of a predetermined Y-signal section is regarded as the C-judgment result.

The above embodiment of this invention makes it possible to conduct component color signal processing, so that the basic picture quality can be improved and pictures of a generally higher quality can be photographed.

Figure 15:
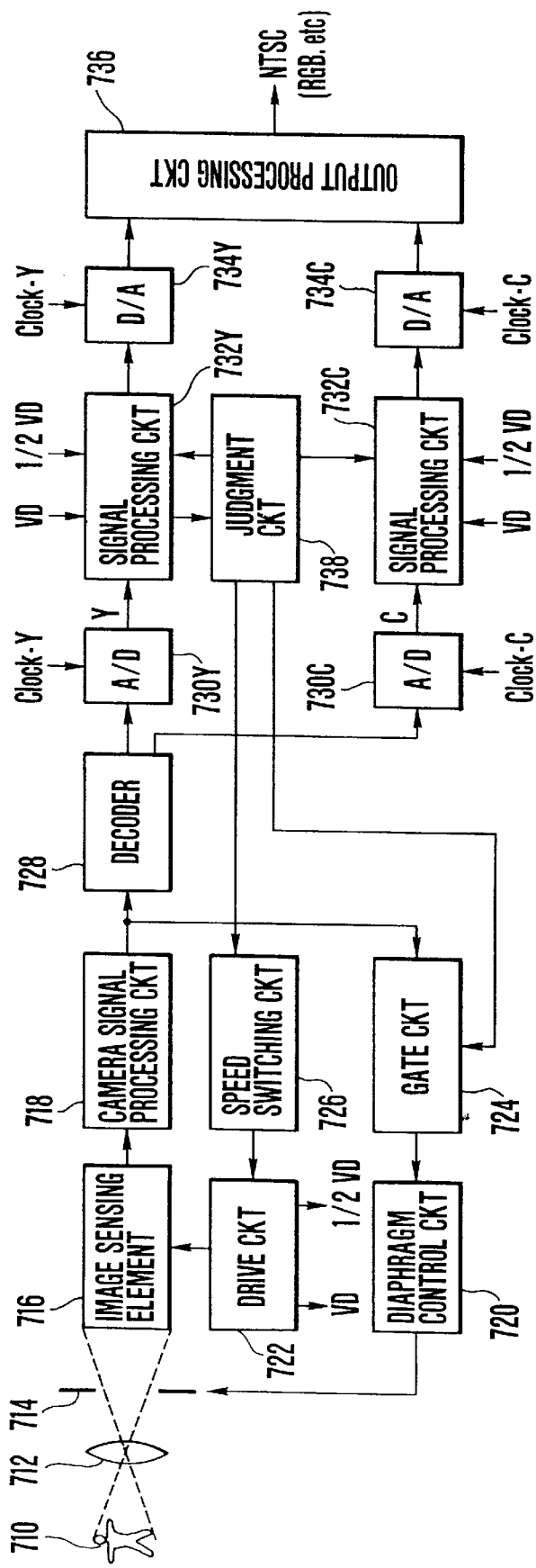
FIG. 15 is a block diagram showing the entire fourth embodiment of the present invention.

A fourth embodiment of this invention will now be explained with reference to FIGS. 15 to 21. In FIG. 15 are shown a subject 710, a photographic lens 712, a diaphragm 714 and an image sensing element 716. The incident light from the subject 710 entering through the lens 712 is restricted in intensity by the diaphragm 714 and applied to the photoelectric conversion surface of the image sensing element 716. A camera signal processing circuit 718 performs various signal processing operations including γ correction in the same way as an ordinary video camera. A diaphragm control circuit 720 controls the diaphragm 714, and a drive circuit 722 drives the image sensing element 716. A gate circuit 724 allows part of the output of the camera signal processing circuit 718 to pass, and a speed switching circuit 726 changes the charge storage time of the image sensing element 716.

The output of the camera signal processing circuit 718 is divided by a decoder 728 into a Y-signal and a color-difference signal (C) of a time division multiple base band, which are applied to signal processing circuits 732Y and 732C through A/D converters 730Y and 730C, respectively. In the signal processing circuits 732Y and 732C, picture element data are transduced, as described later, and applied to an output processing circuit 736 through D/A converters 734Y and 734C. The output processing circuit 736 forms a composite video signal from the input signal and outputs this signal.

A judgment circuit 738 judges whether there are blackenings or white blankings from the Y-signal, and in accordance with the judgment result, provides a switching command signal for the speed switching circuit 726, a control signal for the gate circuit 724, etc.

Figure 16:
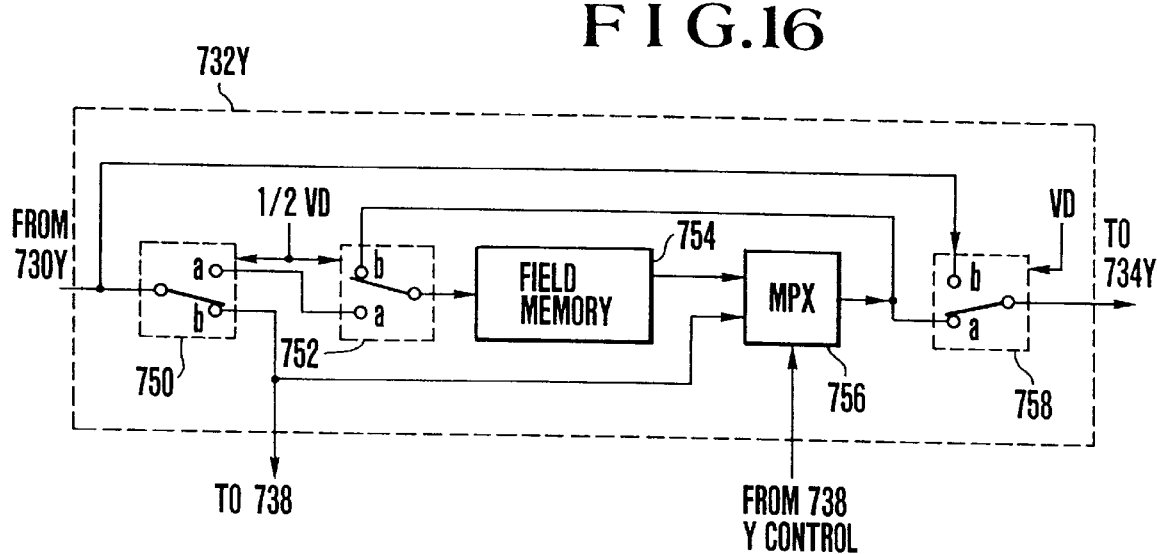
FIG. 16 is a block diagram of the processing circuit 732Y shown in FIG. 15.

The processing circuits 732Y and 732C will now be described in detail. While only the processing circuit 732Y is shown in FIG. 16, the processing circuit 732C may substantially be of the same configuration. In FIG. 16, the output of the A/D converter 730Y is applied to switches 750 and 758. The switch 750 is always placed at the contact b in the normal mode (i.e. when there are no white blankings or blackenings on the photographed image), and is alternately placed at the contacts a and b, with $\frac{1}{60}$ sec. as a unit, in the picture element transduction mode (i.e. when there are some white blankings or blackenings on the photographed image). In the picture element transduction mode, the drive circuit 722 drives the image sensing element 716 in such a manner that it alternates the $\frac{1}{60}$ sec. charge storage and the $\frac{1}{1000}$ sec. charge storage for each field, and the switch 750 is placed at the contact a for a $\frac{1}{1000}$ sec. storage picture and at the contact b for a $\frac{1}{60}$ sec. storage picture. The 1/60 sec. storage picture at the contact b of the switch 750 is supplied to the judgment circuit 738 and a multiplexer 756.

In the normal mode, the multiplexer 756 outputs $\frac{1}{60}$ sec. storage pictures supplied for each field, and in the picture element transduction mode, it performs, when in an odd field, picture element transduction between a $\frac{1}{60}$ sec. storage picture from the contact b of the switch 750 and a $\frac{1}{1000}$ sec. storage picture from the field memory 754 to output the picture element transduction picture; when in an even field, it outputs the image from the field memory 754 which has already undergone picture element transduction, as it is. The switch 758, which is normally placed at the contact a, is placed at the contact b during the vertical blanking period. This arrangement is made for the purpose of forming interlace signals.

The operation in the picture element transduction mode of the switch 752, the field memory 754 and the multiplexer 756 will now be described in more detail referring to FIGS. 17(*a*) to 17(*g*). FIG. 17(*a*) represents the switching control signal for the switches 750 and 752, which are placed at the contact a for "H" and at the contact b for "L". FIG. 17(*b*) represents the switching control signal for the switch 758, which is placed at the contact a for "H", and at the contact b for "L". FIG. 17(*c*) shows the charge storage operation of the image sensing element 716, the $a_n$ and $b_n$ being representative of the charge storage times ($\frac{1}{1000}$ sec. and $\frac{1}{60}$ sec. in this example). FIG. 17(*d*) shows the output of the image sensing element 716. FIG. 17(*e*) shows the signal written to the field memory 754, FIG. 17(*f*) shows the signal which is read out of the field memory 754, and FIG. 17(*g*) shows the output of the multiplexer 756. The field memory 754 is a memory of the type which is capable of performing both writing and reading operations.

The $a_1$, which is a $\frac{1}{1000}$ sec. storage picture, is delayed by one field period by the field memory 754, picture element transduction being performed by the multiplexer 756, between the $a_1$ and the $\frac{1}{60}$ sec. storage picture $b_1$ of the next field. The image MIX-1 obtained through the picture element transduction is supplied to the switch 758, and at the same time, written to the field memory 754 through the intermediary of the switch 752. The image MIX-1 is applied to the multiplexer 756, delayed by one field period. At this time, only the image MIX-1 is applied to the multiplexer 756, so that the multiplexer 756 outputs the image MIX-1 to the switch 758 again.

After that, similar processings are carried out, the multiplexer 756 outputting MIX-1, MIX-1, MIX-2, MIX-2, . . . Here, it may be thought to be possible to improve the time resolution by performing picture element transduction between $b_1$ and $a_2$ in the next field, subsequent to the transduction between $a_1$ and $b_1$. However, the discrepancy in time between $b_1$ and $a_2$ is too great, so that it may as likely as not give rise to inconveniences in the case of moving pictures.

Figure 18:
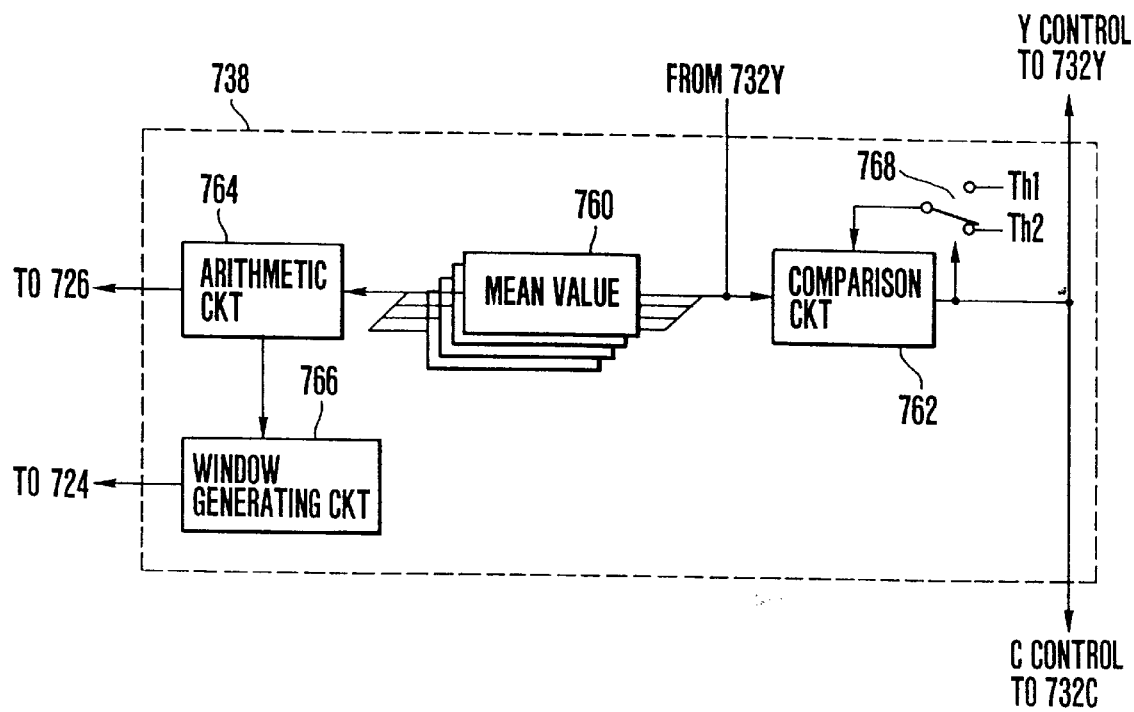
FIG. 18 is a block diagram of the judgment circuit 738 shown in FIG. 15.
Figure 19:
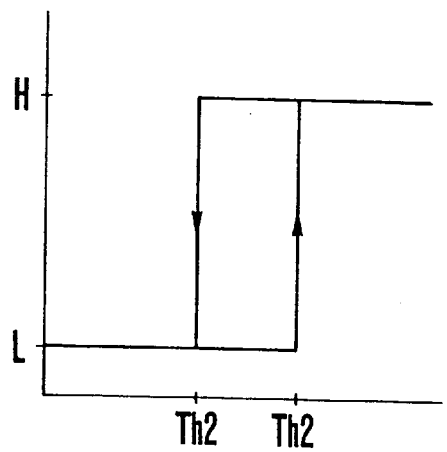
FIG. 19 is a view showing the hysteresis characteristics of the reference threshold of the judgment circuit 738.
Figure 20:
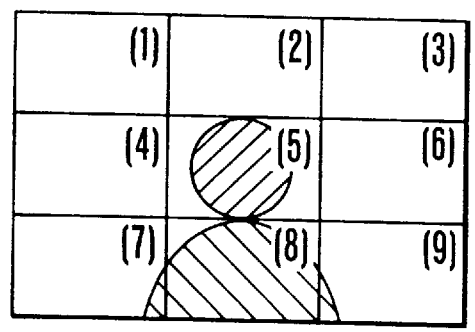
FIGS. 20 and 21 are views showing examples of area division for the mean value calculating circuit 760.
Figure 21:
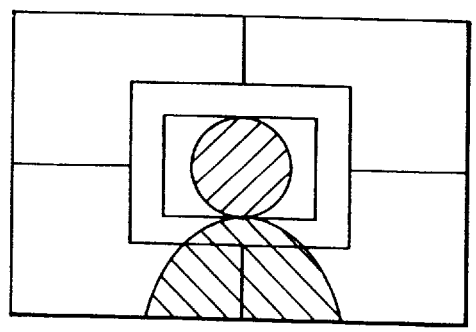

FIG. 18 is a block diagram showing a specific example of the judgment circuit 738. The Y-signal of $\frac{1}{60}$ sec. storage from the processing circuit 732Y (more specifically, from the contact b of the switch 750) is applied to a mean value calculation circuit 760 and a comparison circuit 762 adapted to detect white blankings. The mean value calculation circuit 760 divides a picture into a plurality of areas, as shown, for example, in FIGS. 20 and 21, and calculates the mean value of the luminance levels in the areas and supplies the result to an arithmetic circuit 764. The arithmetic circuit 764 calculates the difference between the maximum and minimum values of the mean values of the areas and supplies control signals to the speed switching circuit 726 in such a manner that the picture element transduction mode is selected when the calculated value is larger than a predetermined value and that the normal mode is selected when the calculated value is equal to or smaller than the predetermined value. The arithmetic circuit 764 consists of an ordinary microcomputer. Further, the mean luminance levels of the areas calculated by the mean value calculation circuit 760 can also be utilized for the purpose of determining the photometric frame for diaphragm adjustment, the arithmetic circuit 764 outputting the photometric frame information to a window generating circuit 766.

The comparison circuit 762 compares the Y-signal from the processing circuit 732Y with the threshold from a threshold switch 768, and outputs "L" when the signal is below the threshold and "H" when it is above the threshold. In the initial stage, the threshold switch 768 selects the threshold Th2 shown in FIG. 19; when the output of the comparison circuit 762 becomes "H", it changes the selection threshold to Th1, and when the output of the comparison circuit 762 becomes "L", it selects the threshold Th2 again. By providing such hysteresis characteristics, frequent issuance of the white blanking judgment at isolated points such as noises can be avoided. The output of the comparison circuit 762 is supplied to the processing circuit 732Y as the Y-control signal and to the processing circuit 732C as the C-control signal. The processing circuits 732Y and 732C select a 1/60 sec. storage picture when the output of the comparison circuit 762 is "L", and a 1/1000 sec. storage picture when the output is "H".

While it may be possible to adopt in the judgment circuit 738 an arrangement in which a 1/1000 sec. storage picture is used as the input luminance signal in order to judge over blackenings, the above embodiment employs the arrangement in which a 1/60 sec. storage picture is input to the judgment circuit 738 because white blankings are more easily detected than blackenings and the switching between the normal mode and the picture element transduction mode must be carried out under the same storage conditions.

As will be appreciated from the above description, this embodiment makes it possible to photograph not only the subject but also the background with a proper exposure even under a back light condition, with the dynamic range being substantially widened. Further, by supervising the luminance level during the normal photographing and by performing the normal photographing when the exposure is proper, deterioration in the time resolution can be avoided as long as the exposure is appropriate.

What is claimed is:

1. An image sensing apparatus comprising:

(a) image sensing means for sensing an image;

(b) image composing means for composing an image with a plurality of image signals output from said image sensing means;

(c) comparison means for comparing a luminance signal level of said plurality of image signals with a predetermined reference level, said comparison means evaluating the luminance signal level distribution;

(d) controlling means for controlling a composing condition based on a comparison result of said comparison means.

2. An image sensing apparatus according to claim 1, wherein said image composing means include a selection circuit.

3. An image sensing apparatus according to claim 1, wherein said comparison means evaluate a histogram of luminance signal level distribution.

4. An image sensing apparatus according to claim 1, wherein said control means change a border of said plurality of image signals.

5. An image sensing apparatus comprising:

(a) image sensing means for sensing an image;

(b) image composing means for composing an image with a plurality of image signals output from said image sensing means;

(c) histogram evaluate means for evaluating a histogram of a luminance signal level distribution of said plurality of image signals;

(d) controlling means for controlling a composing condition based on an output of said histogram evaluate means.

6. An image sensing apparatus according to claim 5, wherein said image composing means include a selection circuit.

7. An image sensing apparatus according to claim 5, wherein said control means change a border of said plurality of image signals.

* * * * *

UNITED STATES PATENT AND TRADEMARK OFFICE
CERTIFICATE OF CORRECTION

PATENT NO. : 5,969,761
DATED : October 19, 1999
INVENTOR(S) : Koji Takahashi, et al.

It is certified that error appears in the above-identified patent and that said Letters Patent is hereby corrected as shown below:

Col. 1, line 5, delete "field" and insert -- filed --.
Col. 5, line 6, delete "TPULSE" and insert -- $T_{pulse}$ --.

Signed and Sealed this

Seventeenth Day of October, 2000

Attest:

Q. TODD DICKINSON

*Attesting Officer*     *Director of Patents and Trademarks*